June 1, 1965   L. H. GRAVOS ETAL   3,186,575
PASTRY CONTAINER AND CARRIER
Filed June 1, 1962   2 Sheets-Sheet 1

Leif H. Gravos
Audrey F. Gravos
INVENTORS

BY *[signatures]*
Attorneys

June 1, 1965 L. H. GRAVOS ETAL 3,186,575
PASTRY CONTAINER AND CARRIER
Filed June 1, 1962 2 Sheets-Sheet 2
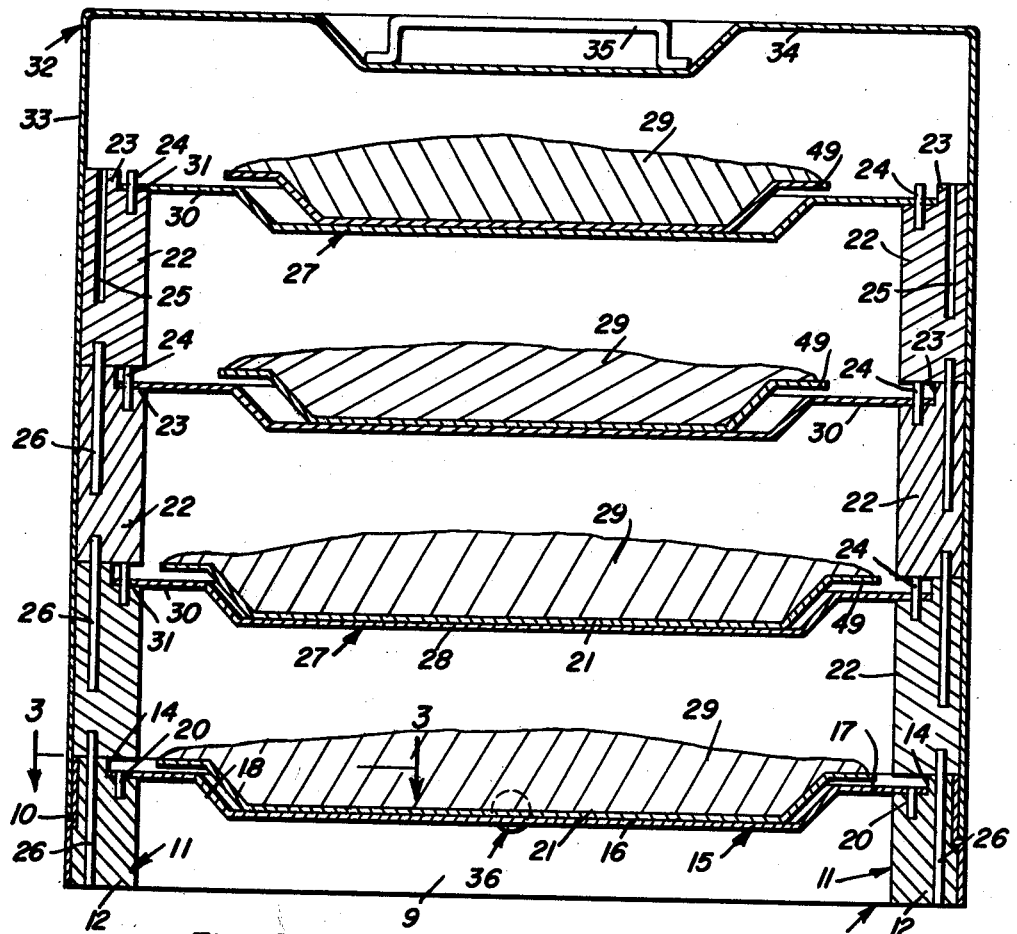
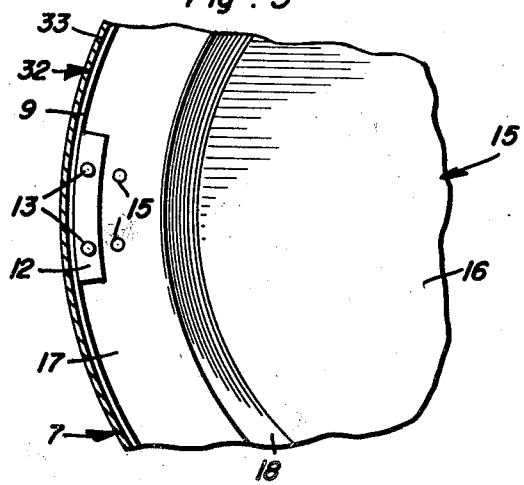
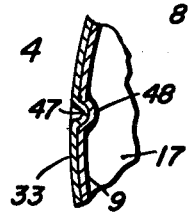
Leif H. Gravos
Audrey F. Gravos
INVENTORS
BY *[signatures]*
Attorneys

United States Patent Office 3,186,575
Patented June 1, 1965

3,186,575
PASTRY CONTAINER AND CARRIER
Leif H. Gravos and Audrey F. Gravos, Arnegard, N. Dak.
Filed June 1, 1962, Ser. No. 199,513
3 Claims. (Cl. 220—20)

This invention relates to new and useful improvements in pastry containers and carriers particularly, although by no means necessarily, for pies and has for its primary object to provide, in a manner as hereinafter set forth, novel means, especially useful for picnics and other outings, whereby a plurality of pies of various sizes may be safely transported or stored until they are to be used.

Another highly important object of the present invention is to provide an improved container and carrier of the aforementioned character which is readily adjustable to accommodate any desired number of pies of different sizes.

Still another important object is to provide a carrier of the character described wherein the pies being transported and particularly the edges thereof, will be protected against damage.

Another object is to provide a container and carrier comprising a sectional rack of a unique construction for stacking a plurality of pies or cakes, etc., in vertically spaced relation to each other.

A further object of the present invention is to provide, in a pie, etc., container and carrier comprising a rack and a cover mounted telescopically thereon, novel means for releasably locking said rack to said cover to be lifted therewith.

A still further object is to provide an improved pastry container and carrier which may be easily cleaned and maintained in a thoroughly sanitary condition at all times.

Another object is to provide a carrier of the character set forth which is adapted to serve as a stand for attractively displaying the pies, cakes or other pastries.

Other objects of the invention are to provide a pastry container and carrier which is of comparatively simple construction, strong, durable, attractive in appearance and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a view in vertical section on an enlarged scale through the device, taken substantially on the line 2—2 of FIGURE 1;

FIGURE 3 is a fragmentary view in horizontal section on an enlarged scale, taken substantially on the line 3—3 of FIGURE 2;

FIGURE 4 is a fragmentary view in horizontal section on an enlarged scale, taken substantially on the line 4—4 of FIGURE 1;

Figure 1:
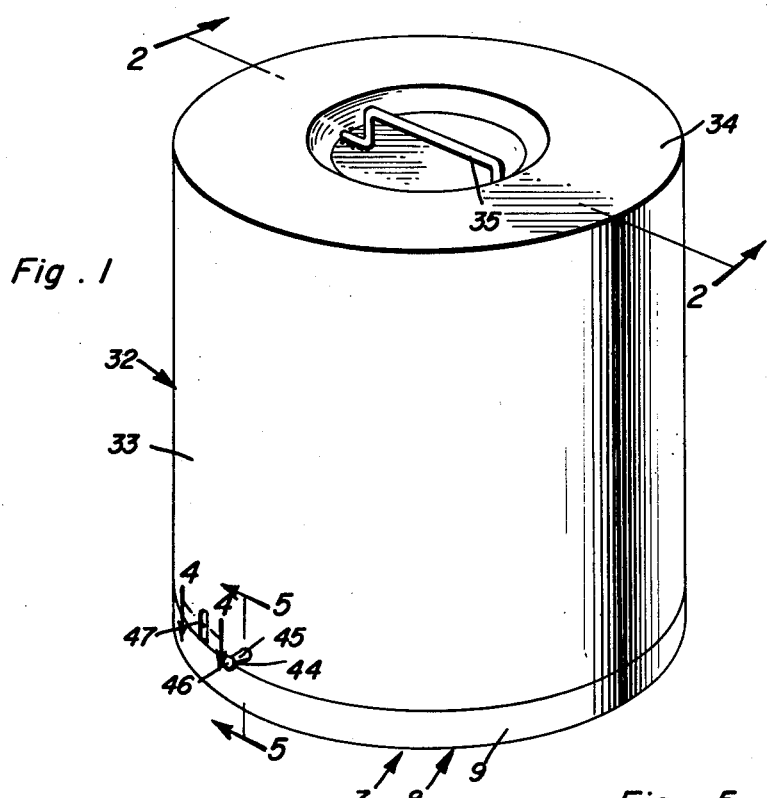
FIGURE 1 is a perspective view of a container and carrier constructed in accordance with the present invention.
Figure 5:
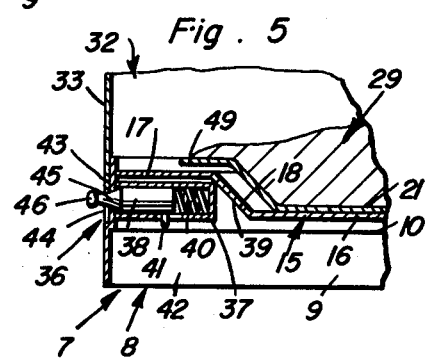
FIGURE 5 is a fragmentary view in vertical section on an enlarged scale through the cover latching means, taken substantially on the line 5—5 of FIGURE 1.
Figure 6:
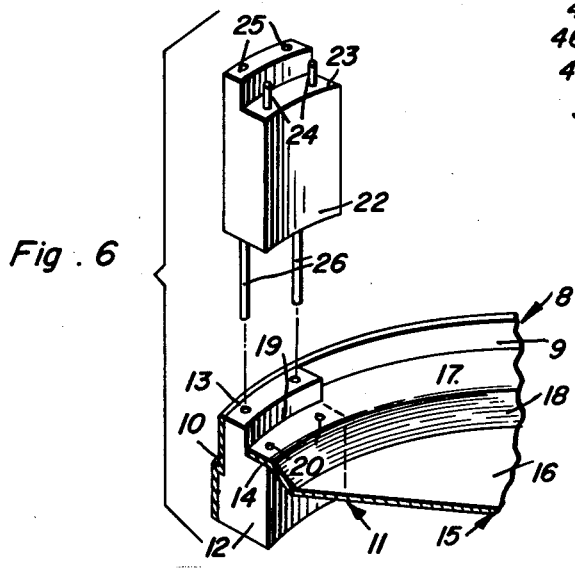
FIGURE 6 is an exploded perspective view of portions of the device.

Referring now to the drawing in detail, it will be seen that the embodiment of the invention which has been illustrated comprises a rack of suitable dimensions and materials which is designated generally by reference numeral 7. The rack 7 includes a base 8 comprising a ring 9. The upper portion of the ring 9 is externally reduced for providing a shoulder or seat 10. Fixedly mounted in the ring 9 are diametrically opposite brackets or the like 11. The brackets 11 include blocks 12 having vertical bores 13 extending through the outer portions thereof. The blocks 12 are further provided, in the upper portions thereof, with inwardly opening rabbets or recesses 14. The base 8 further comprises a circular plate or disk 15 of metal or other suitable material which rests in the rabbet or recess 14 in the blocks 12. The plate 15 includes a bottom 16 and a raised or elevated marginal rim or flange 17 providing a tapered or frusto-conical wall 18. The rim 17 of the plate 15 is recessed or notched as indicated at 19 to accommodate the upper portions of the blocks 12. In the embodiment shown, pins 20 secure the plate 15 in position on the blocks 12. The plate 15 is substantially similar to a conventional pie tin or plate, as indicated at 21, with the exception that the rim or flange 17 of said plate 15 is wider.

Removably mounted on the base 8 are stacks of blocks 22 which are vertically aligned with the blocks 12 and which are supported thereby. The blocks 12 and 22 are substantially similar, said blocks conforming to the curvature of the ring 9. The blocks 22 comprise in their upper end portions inwardly facing recesses or rabbets 23 having mounted therein upstanding pins 24. The upper ends of the blocks 22 are provided, in their outer portions, with elongated bores or sockets 25. Depending from the lower ends of the blocks 22 are retaining pins or rods 26 which are slidably engageable in the bores or sockets 13 and 25 of the subjacent blocks. Thus, the blocks 22 are secured in stacked relation on the base blocks 12.

Mounted on the blocks 22 is a plurality of shelves 27 in the form of circular plates or disks 28 which, like the base plate 15, are for the reception of conventional plates or tins 21 containing pies or other pastry 29. The plates 28 are substantially similar to the base plate 15 with the exception that said plates 28 are removable. Toward this end, the rims or flanges 30 of the plates 28 are apertured at 31 to accommodate the upstanding pins 24 on the blocks 22. Thus, the assembly is further secured.

Removably mounted on the rack 11 is a hood or cover 32 of a transparent plastic or other suitable material. The cover 32 includes a cylindrical body 33 which telescopes over the rack 11 and rests on the seat or shoulder 10 of the base ring 9. The cover 32 further includes a top 34 having recessed therein a suitable carrying handle 35.

Diametrically opposite locks 36 in the base 8 releasably secure the cover 32 in operative position on the rack 7. In the embodiment shown, the locks 36 include cylinders 37 which are fixed radially in the upper portion of the ring 9. Spring-projected bolts 38 are slidable in the cylinders 37. The cylinders 37 include closed inner ends 39. Coil springs 40 in the cylinders 37 yieldingly urge the bolts 38 outwardly. Stop lugs 41 on the bolts 38 are operable in longitudinal slots 42 which are provided therefor in the cylinders 37. The bolts 38 project through openings 43 which are provided therefor in the upper portion of the ring 9. The openings 43 register with the upper portions of keyhole slots 44 in the lower end portion of the cover 32. The bolts 38 include substantially tapered or conical outer end portions 45 which terminate in heads or buttons 46. The tapered portions 45 of the bolts 38 are adapted to seat in the large upper end portions of the keyhole slots 44 for locking the base 8 to the cover 32, the portions of said bolt which seat in said keyhole slots being too large to pass through the narrow portions of said slots. However, by pushing inwardly on the bolts 38 against the tension of the springs 40 further reduced portions of said bolts are presented to the slots 44 and the cover 32 may now be lifted off the rack 7. To facilitate locking the cover on the rack, the lower portion of the skirt or cylinder 33 of said cover and the upper portion of the ring 9 are provided, respectively, with an internal vertical matching rib and groove or channel 47 and 48 (FIGURE 4). When the cover 32 is slipped on the base 8 with the rib 47 engaged in the channel 48 the upper end portions of the keyhole slots 44 are aligned with the openings 43 and the bolts 35.

It is thought that the use of the device will be readily apparent from a consideration of the foregoing. Briefly, a pie as indicated at 27 is placed on the shelf, plate or holder 15 of the base 8. As many of the blocks 16 and shelves or plates 27 as may be desired are then stacked on the base 8, the pies 29 or other pastry being mounted on said shelves or plates as they are applied. Or, the pies may be slipped on the shelves after the rack is assembled to the desired height. It will be noted that the shelves or plates 27 are positively secured in position on their respective blocks 22.

It also will be observed that the construction is such that the container is substantially dustproof for protecting the contents. The shelves 15 and 27 are adapted to accommodate pies, etc., of various sizes. The rims 17 of the shelves or plates 15 and 27 being materially wider than the rims 49 of the pie plates or tins 21, said rims 49 cannot touch the blocks 12 and 22, the ring 9, etc. Thus, the edge portions of the pie crusts are protected against damage from this source. In this manner the pleasing appearance of the pies is preserved.

With the bolts 38 in operative position the rack 7 is locked to the cover 32 to be lifted and transported therewith. By retracting the bolts in substantially the manner previously described, the cover 32 may be removed for exposing the loaded rack. The pies may then be selected and removed as desired. Or, the rack may be used as a display stand for the pies, cakes or other pastry. Still further, the cover 29 may, as previously indicated, be a clear or transparent plastic or other material to allow the contents to be viewed therethrough.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pastry container and carrier comprising a rack and a cover, the rack including a base comprising a ring, stacks of vertically aligned spacing blocks mounted on the ring, the blocks in said stacks being transversely aligned, and pastry shelves removably mounted on selected ones of said transversely aligned blocks, said cover including a top and depending hollow body defining an open bottom for telescopically receiving the rack therethrough, and means for releasably locking the cover to the ring whereby the rack and cover may be lifted as an assembly.

2. A pastry container comprising a rack, said rack including a pair of spaced vertical stacks of abutting blocks, said blocks being arranged in transverse pairs, each block having an inwardly facing recess therein forming a support ledge along the inner upper portion of the block below the upper surface thereof, vertically projecting pins fixed to the ledges, said pins having the upper ends thereof terminating on a line with or below the upper surfaces of the corresponding blocks so as to allow an abutment of the upper surface of a subjacent block with the lower surface of a superjacent block, vertical bores extending inwardly from the upper surfaces of the blocks, vertical depending pins fixed to the superjacent blocks removably engaged in the bores of the subjacent blocks upon an abutting of the blocks, and a plurality of shelves, said shelves being removably supported, at the outer edges thereof, on selected transversely aligned pairs of ledges, the outer edges of the shelves having holes therethrough corresponding to and receiving the ledge pins so as to releasably lock the shelves to the stacks.

3. The container of claim 2 including a cover consisting of a hollow vertically elongated body defining an open bottom for telescopically receiving the rack therethrough, a top on said body, and means for releasably locking the body to the lowermost pair of blocks whereby the rack and cover may be lifted as an assembly.

References Cited by the Examiner

UNITED STATES PATENTS

| 369,112 | 8/87 | Jory | 220—97 |
| 762,529 | 6/04 | Hodges | 312—108 |
| 1,512,867 | 10/24 | Sutter | 108—91 |
| 1,622,494 | 3/27 | Cranston | 312—284 X |

FOREIGN PATENTS 876,726  4/53  Germany.

THERON E. CONDON, *Primary Examiner.*

GEORGE O. RALSTON, EARLE J. DRUMMOND,
*Examiners.*